United States Patent
Kozakiewicz

(10) Patent No.: US 10,920,635 B2
(45) Date of Patent: Feb. 16, 2021

(54) EXHAUST GAS AFTERTREATMENT SYSTEM WITH A REDUCING AGENT MIXER HAVING AN INJECTOR TIP PROTECTOR

(71) Applicant: Faurecia Emissions Control Technologies, USA, LLC, Columbus, IN (US)

(72) Inventor: Tomasz Kozakiewicz, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 1 day.

(21) Appl. No.: 16/391,792

(22) Filed: Apr. 23, 2019

(65) Prior Publication Data

US 2020/0340379 A1  Oct. 29, 2020

(51) Int. Cl.
*F01N 3/20* (2006.01)
*B01D 53/90* (2006.01)
*F01N 13/18* (2010.01)

(52) U.S. Cl.
CPC .............. *F01N 3/206* (2013.01); *B01D 53/90* (2013.01); *F01N 13/1838* (2013.01); *B01D 2251/2067* (2013.01); *B01D 2257/404* (2013.01); *F01N 3/2066* (2013.01); *F01N 2610/02* (2013.01); *F01N 2610/08* (2013.01); *F01N 2610/1406* (2013.01); *F01N 2610/1453* (2013.01)

(58) Field of Classification Search
CPC .. F01N 3/206; F01N 13/1838; F01N 2610/02; F01N 2610/1406; F01N 2610/1453; F01N 3/2066; F01N 2610/08; B01D 53/90; B01D 2257/404; B01D 2251/2067
See application file for complete search history.

(56) References Cited

U.S. PATENT DOCUMENTS

| | | | |
|---|---|---|---|
| 8,371,114 B2 * | 2/2013 | Hayashi | F01N 3/2066 60/317 |
| 9,289,724 B2 | 3/2016 | Stanavich | |
| 9,664,081 B2 | 5/2017 | Rusch | |
| 9,714,598 B2 | 7/2017 | Alano | |
| 10,196,957 B2 * | 2/2019 | Petry | B01F 5/0065 |
| 2012/0090305 A1 | 4/2012 | Floyd | |
| 2014/0334986 A1 * | 11/2014 | Stanavich | B01F 3/04049 422/168 |
| 2016/0061078 A1 | 3/2016 | Schmidt | |
| 2016/0076425 A1 | 3/2016 | Goffe | |
| 2017/0191395 A1 | 7/2017 | Alano | |

FOREIGN PATENT DOCUMENTS

| | | |
|---|---|---|
| EP | 1314864 | 1/2007 |
| EP | 2492465 | 8/2012 |
| EP | 3392480 | 10/2018 |

* cited by examiner

*Primary Examiner* — Brandon D Lee
(74) *Attorney, Agent, or Firm* — Barnes & Thornburg LLP

(57) ABSTRACT

A vehicle includes an exhaust aftertreatment system for use with an automotive internal combustion engine. The system includes a reducing agent mixer configured to deliver a reducing agent for mixing with exhaust gases produced by the engine. The reducing agent mixer includes a mixing can defining an internal space, a doser configured to inject the reducing agent toward the internal space, and a reducing agent delivery device configured to direct the reducing agent into the internal space.

11 Claims, 3 Drawing Sheets

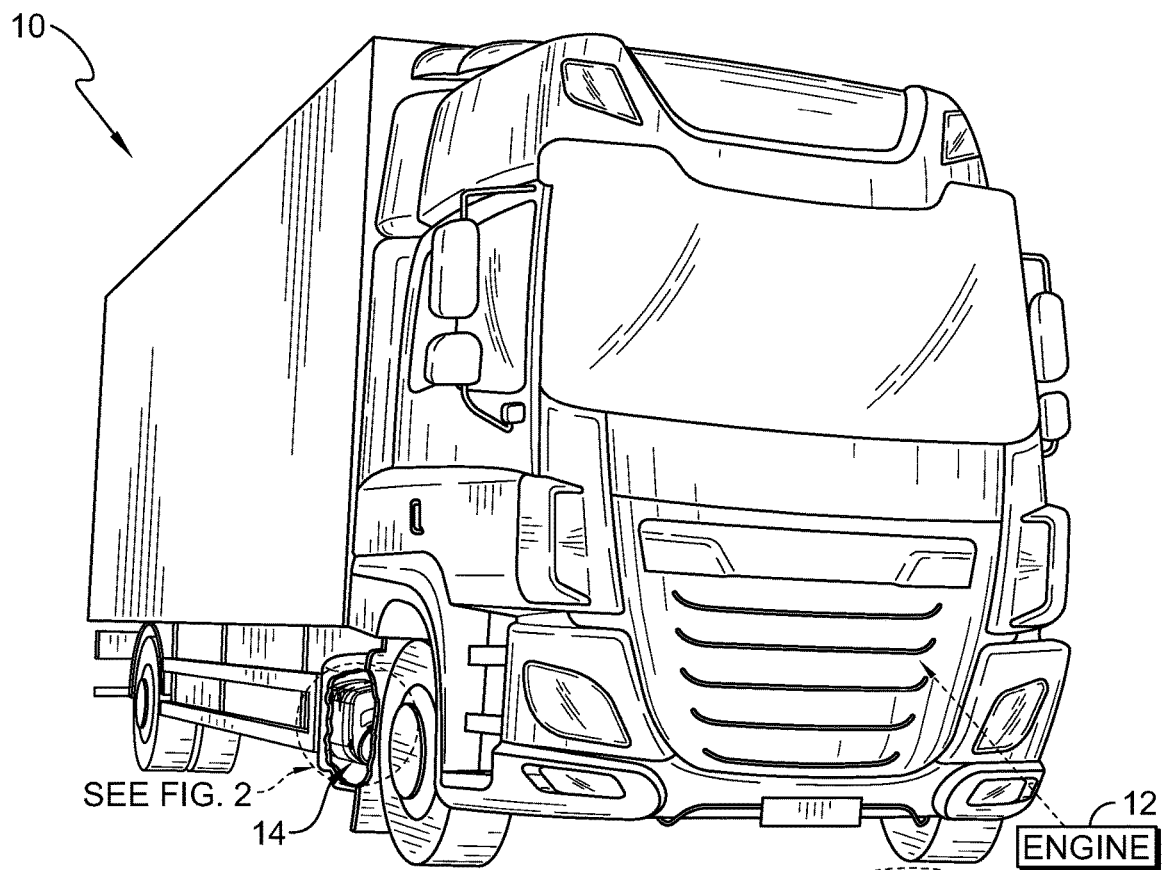
FIG. 1
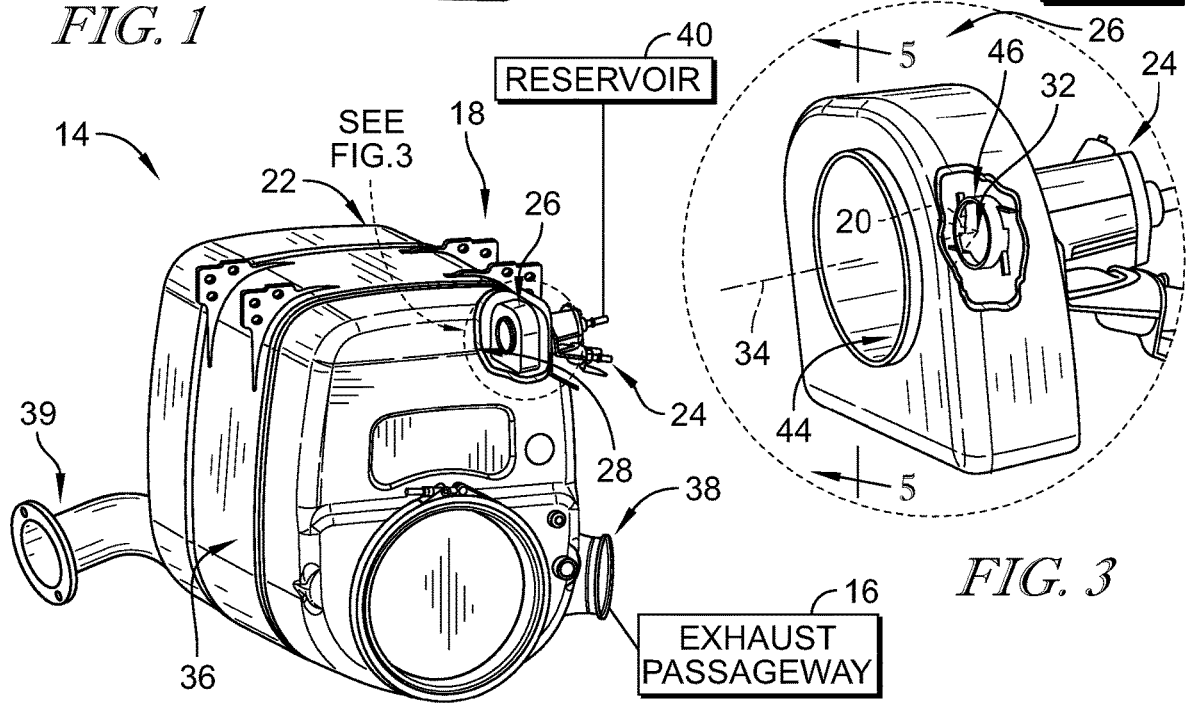
FIG. 2
FIG. 3

EXHAUST GAS AFTERTREATMENT SYSTEM WITH A REDUCING AGENT MIXER HAVING AN INJECTOR TIP PROTECTOR

BACKGROUND

The present disclosure relates to exhaust aftertreatment systems for treating exhaust gases produced in automotive applications, and particularly to an aftertreatment system for injecting and mixing a reducing agent into the exhaust gases.

SUMMARY

A vehicle in accordance with the present disclosure includes an internal combustion engine that produces exhaust gases and an exhaust aftertreatment system that treats the exhaust gases to reduce or remove unwanted chemicals before releasing the exhaust gases into the atmosphere. The exhaust after treatment system includes a reducing agent mixer that is configured to inject and mix a reducing agent with the exhaust gases produced by the engine.

The reducing agent mixer includes a mixing can, a doser, and a reducing agent delivery device. The mixing can defines an internal space through which the exhaust gases flow. The doser injects the reducing agent into the internal space of the mixing can from an injector tip along a doser axis. The reducing agent delivery device encourages movement of the reducing agent away from the doser and into a flow of the exhaust gases moving through the mixing can.

The reducing agent delivery device includes a doser attachment, an injection cone and an injector tip protector. The doser attachment supports the doser relative to the mixing can. The injection cone conducts reducing agent from the doser away from the doser and into the flow of the exhaust gases. The injection cone has an inlet aperture spaced from the injector tip of the doser that is arranged to receive the reducing agent as well as a secondary flow of exhaust gas that encourages movement of the reducing agent away from the injector tip of the doser. The injector tip protector is arranged around the doser axis at the injector tip and is configured to discourage the build up of reducing agent materials around the injector tip.

The injector tip protector includes a cylindrical wall and a plurality of fins coupled to the cylindrical wall. The cylindrical wall is coupled to the doser attachment and extends away from the doser. The cylinder wall is illustratively formed to include a plurality of slots spaced circumferentially around the cylindrical wall that admit a secondary flow of exhaust gas to encourage movement of the reducing agent away from the injector tip. Each fin is positioned adjacent to a corresponding slot and is angled relative to its corresponding slot so as to encourage swirling motion of the exhaust gas around the injector tip.

A majority of the exhaust gases flowing toward the injector tip are blocked by the cylindrical wall and redirected through the inlet aperture of the injection cone. The reducing agent is injected towards the inlet aperture and joins the majority of the exhaust gases downstream of the injector tip. A smaller portion of the exhaust gases flows through each of the slots toward the injector tip. The smaller portion of exhaust gases are induced into a swirl to encourage the reducing agent to flow toward the inlet aperture without forming deposits on the injector tip.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is perspective view of an automotive vehicle including an internal combustion engine and an exhaust aftertreatment system for treating exhaust gases produced by the engine;

FIG. 2 is a perspective view of the exhaust aftertreatment system of FIG. 1 with a portion broken away to show a reducing agent mixer fluidly coupled to the exhaust aftertreatment system and configured to discharge a reducing agent into the exhaust gases;

FIG. 3 is an enlarged perspective view of the reducing agent mixer of FIG. 2 with portions removed showing that the reducing agent mixer includes an injector tip protector that discourages the exhaust gases from reaching an injector tip where the reducing agent is discharged into the exhaust gases so as to mitigate against buildup of materials in the reducing agent;

DETAILED DESCRIPTION

Figure 4:
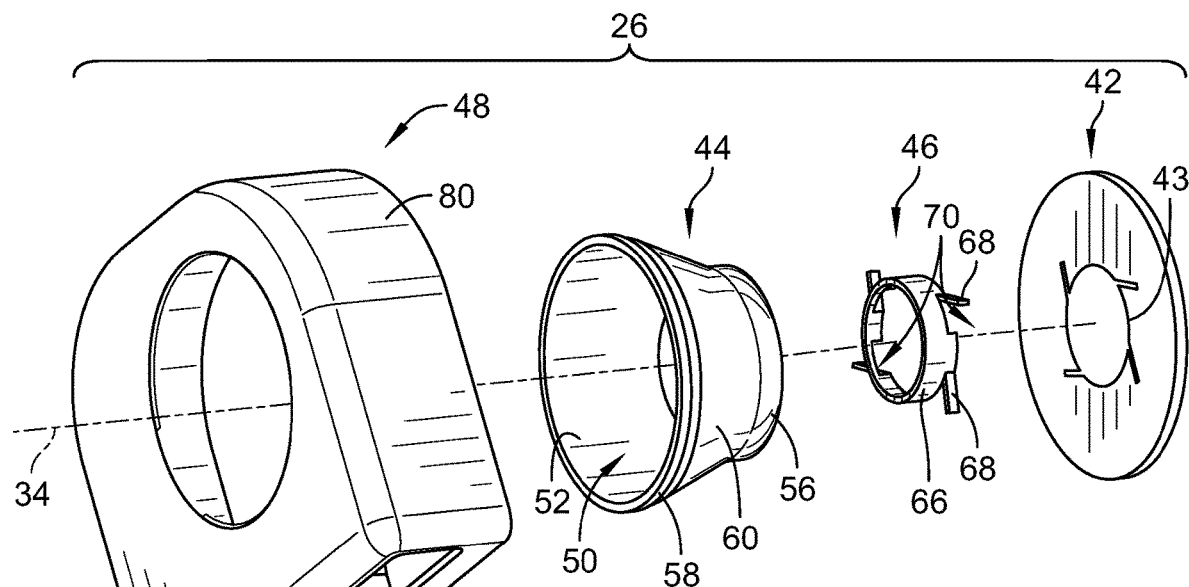
FIG. 4 is an exploded assembly view of a portion of the reducing agent mixer showing that the reducing agent delivery device includes—from left to right—an exhaust guide, an injection cone, the injector tip protector, and a doser attachment.

An illustrative vehicle 10 includes an engine 12 an exhaust aftertreatment system 14 in accordance with the present disclosure as shown, for example, in FIG. 1. The engine 12 is, illustratively, an internal combustion engine configured to combust fuel and discharge exhaust gases that are distributed through an exhaust passageway 16, as shown in FIG. 2, treated by the exhaust aftertreatment system 14, and then released into the atmosphere. The exhaust aftertreatment system 14 is configured to reduce various effluents in the exhaust gases, such as, for example, nitrogen oxides (NOx), before the exhaust gases are released to the atmosphere.

In the illustrative embodiment, the exhaust aftertreatment system 14 is a compact unit that includes a plurality of exhaust aftertreatment devices such as, for example, a diesel oxidation catalyst (DOC), a diesel particulate filter (DPF), and a selective catalytic reduction unit (SCR). The exhaust gases pass through or by each of the aftertreatment devices to remove or reduce different effluents. The exhaust aftertreatment system 14 further includes a reducing agent mixer 18 mounted upstream of the SCR for injecting and mixing a reducing agent 20, illustratively a urea solution, into the exhaust gases. Chemical reaction of the reducing agent 20 with the exhaust gases occurs in downstream of the reducing agent mixer 18 in the SCR to reduce NO$_x$ before the exhaust gases are released in the atmosphere.

The reducing agent mixer 18 includes a mixing can 22, a doser 24, and a reducing agent delivery device 26 as shown in FIGS. 2 and 3. The mixing can 22 is shaped to define an internal space 28 that receives the exhaust gases and the reducing agent 20 for mixing therein. The doser 24 is mounted outside of the mixing can 22 and has an injector tip 30 configured to discharge predetermined amounts of reducing agent 20 into the internal space 28 of the mixing can 22 along a doser axis 34. The reducing agent delivery device 26 is configured to induce mixing of the reducing agent 20 with the exhaust gases while reducing the formation of reducing agent deposits on an injector tip 32 of the doser 24 as suggested in FIG. 3.

The mixing can 22 includes a housing 36, an inlet conduit 38, and an outlet conduit 39 as shown in FIG. 2. The housing 36 defines the internal space 28 and houses the DOC, DPF, SCR and at least a portion of the reducing agent mixer 18. The inlet conduit 38 is fluidly coupled to the exhaust passageway 16 and the engine 12. The outlet conduit 39 directs the cleaned exhaust gases out of the housing 36 and toward the atmosphere.

The doser 24 is coupled to the housing 36 of the mixing can 22 and is configured to conduct the reducing agent 22 from a reducing agent reservoir 40 toward the reducing agent delivery device 26 from the injector tip 32 as shown in FIG. 3. The reducing agent delivery device 26 includes a doser attachment 42, an injection cone 44, an injector tip protector 46 arranged around the doser axis 34, and an exhaust guide 48. The doser attachment 42 supports the doser 24 outside of the mixing can 22. The injection cone 44 is arranged around the doser axis 34 within the mixing can 22 and is configured to conduct the reducing agent 20 discharged from the doser 24 into the internal space 28 of the mixing can 22. The injector tip protector 46 is arranged along the doser axis 34 between the doser attachment 42 and the injection cone 44. The exhaust guide 48 is configured to provide means for collecting a portion of the exhaust gases moving through the internal space 28 and directing the portion of the exhaust gases toward the injector tip 32.

In the illustrative embodiment, the doser attachment 42 supports the doser outside the mixing can 22 as suggested in FIG. 2. The doser attachment 42 is coupled to the mixing can 22 and is formed to include a doser port aperture 43 that coincides with the injector tip 32 of the doser 24. The injector tip protector 46 is coupled to the doser attachment 42 around the doser port aperture 43.

Figure 5:
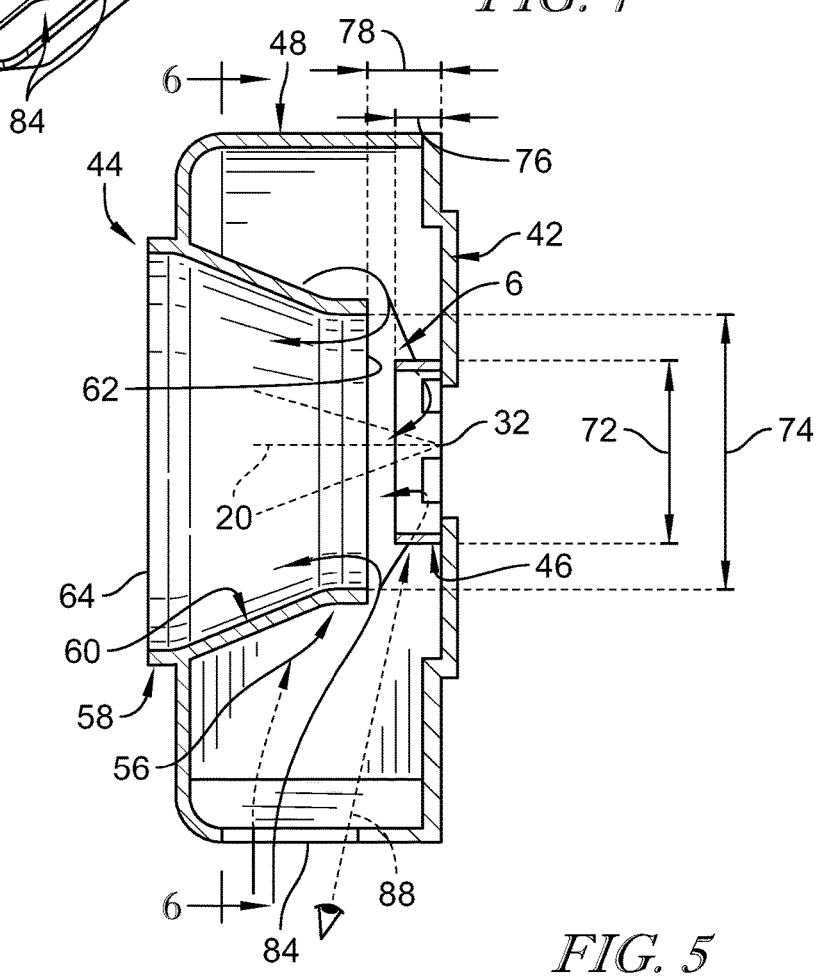
FIG. 5 is a cross-sectional view of the reducing agent delivery device taken along line 5-5 in FIG. 3 with arrows suggesting that a majority of the exhaust gases flow through an inlet aperture of the injection cone without reaching the injector tip.

The injection cone 44 facilitates distribution of the reducing agent 20 as it moves into internal space 28 of mixing can 22 by conducting reducing agent 20 through an expanding distribution channel 50 defined by an interior surface 52 of the injection cone 44 as shown in FIGS. 4 and 5. The injection cone 44 is spaced apart from doser attachment 42 and the injector tip protector 46 of the reducing agent delivery device 26. The injection cone 44 includes an inlet ring 56, an outlet ring 58, and a flared wall 60 that extends the inlet ring 56 and the outlet ring 58 as shown in FIG. 5. The inlet ring 56 defines an inlet aperture 62 that opens into the distribution channel 50. The inlet aperture 62 is aligned with the injector tip 32 of the doser 24 to receive reducing agent 20 and is spaced apart from the injector tip 32 by a gap G to receive a portion of the exhaust gases as suggested in FIG. 5. The flared wall 60 has a hollow, frustoconical shape that flares outward as it extends from the inlet ring 56 to the outlet ring 58. The outlet ring 58 defines an outlet aperture 64 though which reducing agent 20 and the portion of exhaust gases exit the distribution channel 50 into the internal space 28 of the mixing can 22.

The injector tip protector 46 extends around the doser axis 34 to protect the injector tip from the formation of deposits around the injector tip 32 of the doser 24 as shown in FIGS. 3 and 5. The injector tip protector 46 includes a cylindrical wall 66 and a plurality of fins 68 that extend outwardly from the cylindrical wall 66 away from the doser axis 34. The cylindrical wall 66 is formed to include a plurality of slots 70 spaced circumferentially around the doser axis 34. The plurality of slots 70 are sized to allow some exhaust gases to move through the cylindrical wall toward the doser axis 34 so as to encourage flow of reducing agent 20 discharged from the doser 24 along the doser axis 34. Each fin 68 is coupled to the cylindrical wall 66 adjacent to a corresponding slot 70 to guide some exhaust gases through each slot 70 toward the injector tip 32 as suggested in FIG. 5.

The cylindrical wall 66 is mounted to the doser attachment 42 to locate the injector tip protector 46 relative to the injector tip 32 as shown in FIG. 5. The cylindrical wall 66 extends toward the injection cone 44 along the doser axis 34 into the gap G. The injector tip protector 46 is spaced apart from the inlet aperture 62 of the injection cone 44 by a first distance 76 while the injector tip 32 is spaced apart from the inlet aperture 62 by a second distance 78 that is greater than the first distance 76. The cylindrical wall 66 establishes a first internal diameter 72 around the doser axis 34 and the inlet aperture 62 of the injection cone 44 establishes a second internal diameter 74 around the doser axis 34. In the illustrative embodiment, the first diameter 72 is less than the second diameter 74.

During operation, exhaust gases flow toward the injector tip 32 and the inlet aperture 62 of the injection cone 44 as shown in FIG. 5. A majority of the exhaust gases flow around the inlet ring 56 and into the inlet aperture 62 radially between the inlet ring 56 and the cylindrical wall 66 of the injector tip protector 46. A smaller portion of the exhaust gases flow through the slots 70 formed in the cylindrical wall 66 to reach the injector tip 32. In this way, the injector tip protector 46 discourages a majority of the exhaust gases from reaching the injector tip 32 to reduce deposits of reducing agent 20 on and/or around the injector tip 32.

Figure 6:
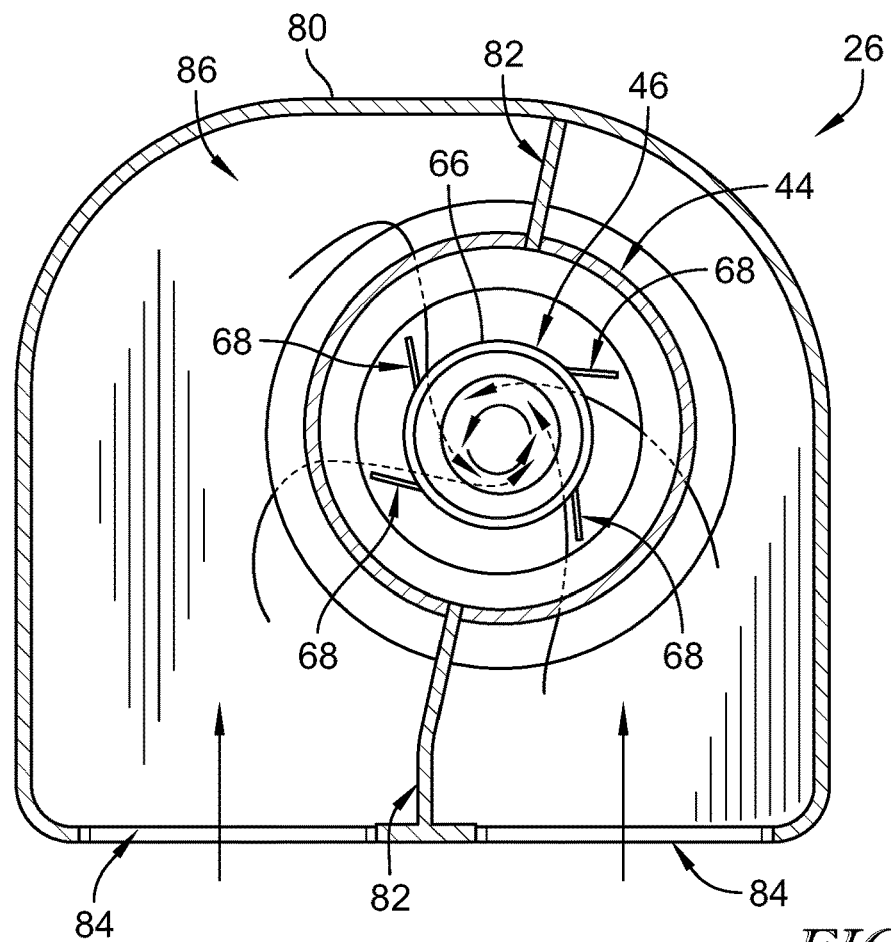
FIG. 6 is a cross sectional view of the reducing agent delivery device taken along line 6-6 in FIG. 5 suggesting that a smaller portion of the exhaust gases are induced into a swirl by the injector tip protector.
Figure 7:
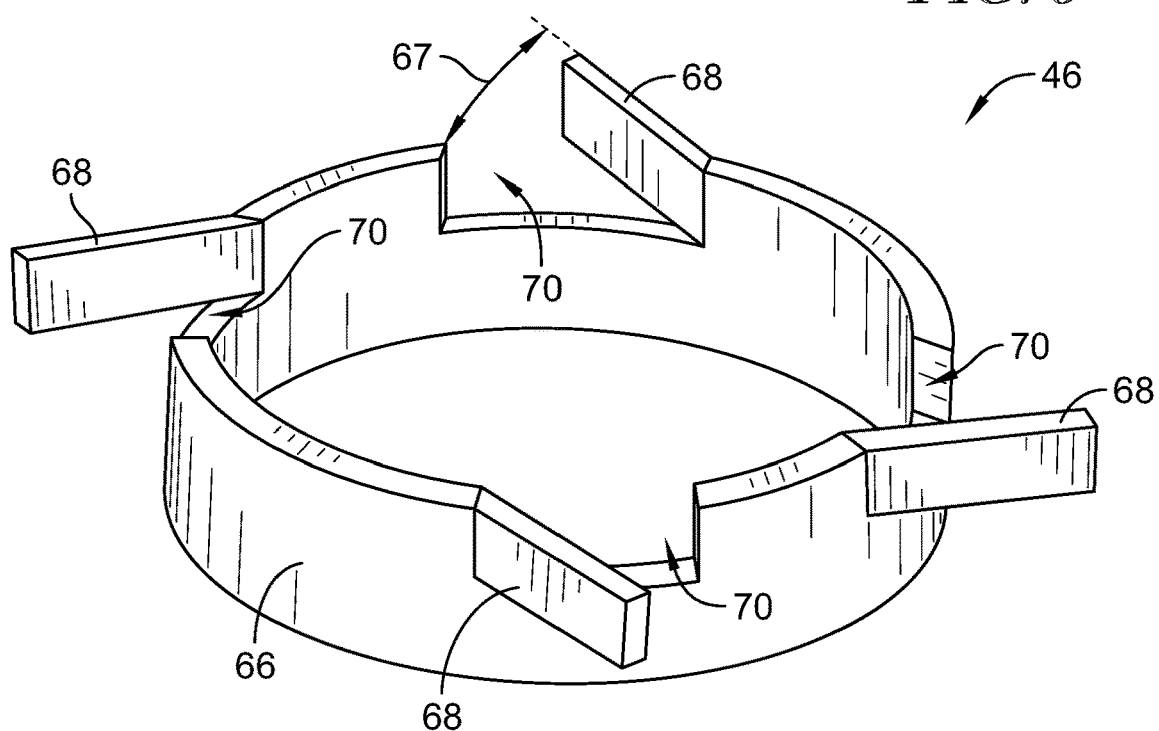
FIG. 7 is an enlarged perspective view of the injector tip protector.

The plurality of fins 68 extend outwardly from the cylindrical wall 66 at angles relative to the cylindrical wall 66 as shown in FIGS. 6 and 7. Each fin 68 is arranged along an axis that forms an acute angle 67 relative to its corresponding slot 70 to guide the smaller portion of the exhaust gases into each slot 70 and induce a swirl around the injector tip 32. The swirl encourages mixing between the smaller portion of the exhaust gases and the reducing agent 20 while the majority of the exhaust gases are blocked from reaching the injector tip 32. The reducing agent 20 flows past the cylindrical wall 66 along the doser axis 34 partially through the gap G toward the inlet aperture 62 of the injection cone 44. The injector tip protector 46 blocks the majority of the exhaust gases from redirecting the reducing agent 20 back towards the injector tip 32 until the reducing agent 20 has reached a sufficient distance from the injector tip 32. This reduces the formation of deposits immediately adjacent to the injector tip 32 which may disrupt the flow of reducing agent into the internal space 28.

The exhaust guide 48 includes a housing 80 and a flow divider 82 as shown in FIGS. 5 and 6. The housing 80 is formed to include at least one window 84 that collects the a portion of the exhaust gases flowing through the internal space 28 and defines an internal region 86. The flow divider 82 separates the internal region 86 into two sub-regions each having a corresponding window 84 for admitting a respective portion of the exhaust gases therein as shown in FIG. 6. Exhaust gases entering the internal region 86 have a direct path from each window 84 to the injector tip protector 46 as suggested by the line of sight indicator 88 in FIG. 5. The injector tip protector 46 blocks a majority of the exhaust gases which flow along the direct path from reaching the injector tip 32.

In the illustrative embodiment, two slots 70 and two corresponding fins 68 are arranged on each side of the flow divider 82 separating the internal region 86 into two sub-regions as shown in FIG. 6. Each pair of slots 70 and corresponding fins 68 directs a smaller portion of the exhaust gases toward the injector tip 32 from each sub-region. The smaller portions of the exhaust gases entering the slots 70 form the swirl around the injector tip 32 to discourage the formation of deposits on the injector tip 32 without the use of the majority of the exhaust gases flowing directly into the inlet aperture 62 of the injection cone 44.

In the illustrative embodiment, the injector tip protector 46 is formed as a one-piece monolithic component that is then machined to have the plurality of slots 70 and the corresponding fins 68 as shown in FIG. 7. In one embodiment, the injector tip protector 46 is first formed as a full ring and each fin 68 is bent away from the cylindrical wall 66 at the acute angle 67 to provide the slots 70 where each fin 68 was once a part of the cylindrical wall 66. In another embodiment, the fins 68 may be formed separately from the cylindrical wall 66 and subsequently attached to the cylindrical wall 66 by welding or another suitable joining process. In yet another embodiment, the injector tip protector 46 is formed without fins 68.

In illustrative embodiments, deposits may form around the nozzle tip 32 during a transient cycle and may increase after a regeneration cycle. The injector tip protector 46 may protect the injector tip 32 from the full exhaust flow going into the swirl cone housing 44. The injector tip protector may redirect most of the exhaust flow into the swirl cone 44. Exhaust flow that enters into the protector is directed into a swirl pattern by the protector 46. The redirection of exhaust flow in the protector reduces the amount of spray deflection at the injector tip 32. This helps reduce the amount of tip deposits that may form without the protector 46. This may reduce warranty failure due to increased tip deposit formation.

The following numbered clauses include embodiments that are contemplated and non-limiting:

Clause 1. A reducing agent mixer adapted for use in an exhaust aftertreatment system associated with an internal combustion engine, the reducing agent mixer comprising a mixing can shaped to define an internal space, the internal space adapted to house mixing of exhaust gases and reducing agent when exhaust gases move in a downstream direction through the reducing agent mixer, a doser mounted outside the mixing can having an injector tip configured to discharge predetermined amounts of reducing agent into the internal space of the mixing can along a doser axis, and a reducing agent delivery device including (i) a doser attachment that supports the doser outside the internal space of the mixing can, (ii) an injection cone arranged around the doser axis within the mixing can and configured to conduct reducing agent discharged from the doser into the internal space of the mixing can, and (iii) an injector tip protector arranged along the doser axis between the doser attachment and an inlet aperture of the injection cone, wherein the injector tip protector extends around the doser axis to protect the injector tip from the formation of deposits around the injector tip.

Clause 2. The reducing agent mixer of any other suitable clause or combination of clauses, wherein the injector tip protector extends from the doser attachment toward the inlet aperture of the injection cone and the injector tip protector is sized to maintain a space along the doser axis between the injector tip protector and the injection cone.

Clause 3. The reducing agent mixer of any other suitable clause or combination of clauses, wherein the injector tip protector includes a cylindrical wall that extends around the doser axis.

Clause 4. The reducing agent mixer of any other suitable clause or combination of clauses, wherein the cylindrical wall of the injector tip protector establishes a first internal diameter around the doser axis, the inlet aperture of the injection cone establishes a second internal diameter around the doser axis, and the first diameter is less than the second diameter.

Clause 5. The reducing agent mixer of any other suitable clause or combination of clauses, wherein the cylindrical wall is formed to include a plurality of slots spaced circumferentially around the doser axis and sized to allow some exhaust gases to move through the cylindrical wall toward the doser axis so as to encourage flow of reducing agent discharged from the doser along the doser axis.

Clause 6. The reducing agent mixer of any other suitable clause or combination of clauses, wherein the plurality of slots are shaped to extend into the cylindrical wall from an inlet end of the cylindrical wall arranged to receive reducing agent discharged from the doser as it enters the injector tip protector.

Clause 7. The reducing agent mixer of any other suitable clause or combination of clauses, wherein the injector tip protector includes a plurality of fins that each extend from a side edge of a corresponding slot of the plurality of slots and the plurality of fins are shaped to encourage swirl about the doser axis into exhaust gases that move through the cylindrical wall toward the doser axis.

Clause 8. The reducing agent mixer of any other suitable clause or combination of clauses, wherein the injector tip protector extends from the doser attachment toward the inlet aperture of the injection cone.

Clause 9. The reducing agent mixer of any other suitable clause or combination of clauses, wherein the injector tip protector is fixed to the doser attachment.

Clause 10. An over the road vehicle, the vehicle comprising an internal combustion engine, a reducing agent reservoir, and an exhaust aftertreatment system comprising a mixing can shaped to define an internal space, the internal space adapted to house mixing of exhaust gases and reducing agent when exhaust gases move in a downstream direction through the reducing agent mixer, a doser mounted outside the mixing can having an injector tip configured to discharge predetermined amounts of reducing agent into the internal space of the mixing can along a doser axis, and a reducing agent delivery device including (i) a doser attachment that supports the doser outside the internal space of the mixing can, (ii) an injection cone arranged around the doser axis within the mixing can and configured to conduct reducing agent discharged from the doser into the internal space of the mixing can, and (iii) an injector tip protector arranged along the doser axis between the doser attachment and the inlet aperture of the injection cone, wherein the injector tip protector extends around the doser axis to protect the injector tip from the formation of deposits around the injector tip.

The invention claimed is:

1. A reducing agent mixer adapted for use in an exhaust aftertreatment system associated with an internal combustion engine, the reducing agent mixer comprising
   a mixing can shaped to define an internal space, the internal space adapted to house mixing of exhaust gases and reducing agent when exhaust gases move in a downstream direction through the reducing agent mixer,
   a doser mounted outside the mixing can having an injector tip configured to discharge predetermined amounts of reducing agent into the internal space of the mixing can along a doser axis, and
   a reducing agent delivery device including (i) a doser attachment that supports the doser outside the internal space of the mixing can, (ii) an injection cone including an inlet ring, an outlet ring spaced apart from the inlet ring and a flared wall interconnecting the inlet ring and the outlet ring, the injection cone arranged around the doser axis within the mixing can and configured to conduct reducing agent discharged from the doser into the internal space of the mixing can through an outlet aperture formed by the outlet ring, and (iii) an injector tip protector arranged along the doser axis between the doser attachment and an inlet aperture defined by the inlet ring of the injection cone, wherein the injector tip protector extends around the doser axis to protect the injector tip from the formation of deposits around the injector tip, and
   wherein the injector tip protector extends from the doser attachment toward the inlet aperture of the injection cone and the injector tip protector is sized to maintain a space along the doser axis between the injector tip protector and the injection cone,
   wherein the injector tip protector includes a cylindrical wall that extends around the doser axis,
   wherein the cylindrical wall is formed to include a plurality of slots spaced circumferentially around the doser axis and sized to allow some exhaust gases to move through the cylindrical wall toward the doser axis so as to encourage flow of reducing agent discharged from the doser along the doser axis,
   wherein the plurality of slots are shaped to extend into the cylindrical wall from an inlet end of the cylindrical wall arranged to receive reducing agent discharged from the doser as it enters the injector tip protector, and
   wherein the injector tip protector includes a plurality of fins that each extend from a side edge of a corresponding slot of the plurality of slots and the plurality of fins are shaped to encourage swirl about the doser axis into exhaust gases that move through the cylindrical wall toward the doser axis.

2. The reducing agent mixer of claim 1, wherein the cylindrical wall of the injector tip protector establishes a first internal diameter around the doser axis, the inlet aperture of the injection cone establishes a second internal diameter around the doser axis, and the first diameter is less than the second diameter.

3. The reducing agent mixer of claim 1, wherein the injector tip protector extends from the doser attachment toward the inlet aperture of the injection cone.

4. The reducing agent mixer of claim 3, wherein the injector tip protector is fixed to the doser attachment.

5. A reducing agent mixer adapted for use in an exhaust aftertreatment system associated with an internal combustion engine, the reducing agent mixer comprising
   a mixing can shaped to define an internal space,
   a doser mounted outside the mixing can having an injector tip configured to discharge a reducing agent into the internal space of the mixing can along a doser axis, and
   a reducing agent delivery device including an injection cone arranged around the doser axis and a doser attachment configured to mount the doser and an injector tip protector arranged along the doser axis between the doser attachment and an inlet aperture of the injection cone, wherein the injector tip protector extends around the doser axis to protect the injector tip from the formation of deposits around the injector tip,
   wherein the injector tip protector includes a cylindrical wall that extends around the doser axis and that is formed to include a plurality of slots spaced circumferentially around the doser axis,
   wherein the injector tip protector includes a plurality of fins that each extend from a side edge of a corresponding slot of the plurality of slots and the plurality of fins are shaped to encourage swirl about the doser axis into exhaust gases that move through the cylindrical wall toward the doser axis, and
   wherein the injector tip protector extends from the doser attachment toward the inlet aperture of the injection cone and the injector tip protector is sized to maintain a space along the doser axis between the injector tip protector and the injection cone.

6. The reducing agent mixer of claim 5, wherein the injector tip protector in a fixed position relative to the mixing can and the injector tip protector extends from the doser attachment toward the inlet aperture of the injection cone.

7. The reducing agent mixer of claim 6, wherein the injector tip protector is fixed to the doser attachment.

8. The reducing agent mixer of claim 5, wherein the cylindrical wall of the injector tip protector establishes a first internal diameter around the doser axis, the inlet aperture of the injection cone establishes a second internal diameter around the doser axis, and the first diameter is less than the second diameter.

9. The reducing agent mixer of claim 8, wherein the plurality of slots are shaped to extend into the cylindrical wall from an inlet end of the cylindrical wall arranged to receive reducing agent discharged from the doser as it enters the injector tip protector.

10. An over the road vehicle, the vehicle comprising
    an internal combustion engine,
    a reducing agent reservoir, and
    an exhaust aftertreatment system comprising
       a mixing can shaped to define an internal space, the internal space adapted to house mixing of exhaust gases and reducing agent when exhaust gases move in a downstream direction through the reducing agent mixer,
       a doser mounted outside the mixing can having an injector tip configured to discharge predetermined amounts of reducing agent from the reducing agent reservoir into the internal space of the mixing can along a doser axis, and
       a reducing agent delivery device including (i) a doser attachment that supports the doser outside the internal space of the mixing can, (ii) an injection cone including an inlet ring, an outlet ring spaced apart from the inlet ring and a flared wall interconnecting the inlet ring and the outlet ring, the injection cone arranged around the doser axis within the mixing can and configured to conduct reducing agent discharged from the doser into the internal space of the mixing can through an outlet aperture formed by the outlet ring, and (iii) an injector tip protector arranged along the doser axis between the doser attachment and an inlet aperture defined by the inlet ring of the injection cone, wherein the injector tip protector extends around the doser axis to protect the injector tip from the formation of deposits around the injector tip, and wherein the injector tip protector extends from the doser attachment toward the inlet aperture of the injection cone and the injector tip protector is sized to maintain a space along the doser axis between the injector tip protector and the injection cone, wherein the injector tip protector includes a cylindrical wall that extends around the doser axis, wherein the cylindrical wall of the injector tip protector establishes a first internal diameter around the doser axis, the inlet aperture of the injection cone establishes a second internal diameter around the doser axis, and the first diameter is less than the second diameter, wherein the cylindrical wall is formed to include a plurality of slots spaced circumferentially around the doser axis and sized to allow some exhaust gases to move through the cylindrical wall toward the doser axis so as to encourage flow of reducing agent discharged from the doser along the doser axis, wherein the plurality of slots are shaped to extend into the cylindrical wall from an inlet end of the cylindrical wall arranged to receive reducing agent discharged from the doser as it enters the injector tip protector, and wherein the injector tip protector includes a plurality of fins that each extend from a side edge of a corresponding slot of the plurality of slots and the plurality of fins are shaped to encourage swirl about the doser axis into exhaust gases that move through the cylindrical wall toward the doser axis.

11. The vehicle of claim 10, wherein the injector tip protector is fixed to the doser attachment.

* * * * *